(12) United States Patent
Aarnio

(10) Patent No.: US 6,522,889 B1
(45) Date of Patent: Feb. 18, 2003

(54) METHOD AND APPARATUS FOR PROVIDING PRECISE LOCATION INFORMATION THROUGH A COMMUNICATIONS NETWORK

(75) Inventor: Ari Aarnio, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/471,875

(22) Filed: Dec. 23, 1999

(51) Int. Cl.$^7$ ................................................ H04Q 7/20
(52) U.S. Cl. ........................ 455/456; 455/457; 455/556; 455/426; 348/207
(58) Field of Search .................... 455/456, 457, 455/556, 426, 422, 566; 348/211, 212, 213, 552, 14.02, 148, 207; 340/989, 990, 995, 993, 991, 937, 998; 382/113

(56) References Cited

U.S. PATENT DOCUMENTS

| | | | | |
|---|---|---|---|---|
| 5,155,774 A | * | 10/1992 | Numagami | 382/113 |
| 5,725,253 A | * | 3/1998 | Salive et al. | |
| 5,731,785 A | * | 3/1998 | Lemelson et al. | 342/357 |
| 5,809,161 A | * | 9/1998 | Aunty et al. | 382/104 |
| 5,973,731 A | * | 10/1999 | Schwab | 348/161 |
| 6,122,521 A | * | 9/2000 | Wilkinson et al. | 455/457 |
| 6,133,947 A | * | 10/2000 | Mikuni | 348/143 |
| 6,233,523 B1 | | 5/2001 | Sood | 701/213 |
| 6,297,748 B1 | * | 10/2001 | Lappenbusch et al. | 340/905 |

FOREIGN PATENT DOCUMENTS

| | | | |
|---|---|---|---|
| EP | 0 705 046 A2 | 4/1996 | H04Q/7/38 |
| EP | 0 785 535 A1 | 7/1997 | G08G/1/0968 |
| EP | 0 869 464 A1 | 10/1998 | G08B/15/00 |
| WO | WO 96/38762 | 12/1996 | |
| WO | WO 98/18085 | 4/1998 | |
| WO | WO 98/19479 | 5/1998 | |
| WO | WO 98/44708 | 10/1998 | |
| WO | WO 99/03253 | 1/1999 | |
| WO | WO 99/18410 | 4/1999 | |

* cited by examiner

*Primary Examiner*—Thanh Cong Le
*Assistant Examiner*—Lana Le
(74) *Attorney, Agent, or Firm*—Cohen, Pontani, Lieberman & Pavane

(57) ABSTRACT

A method and apparatus for obtaining information about an object through interaction between a mobile station (MS) and a computer network such as the Internet, and communicating the information to the MS. A digital camera obtains an image of an object, such as a geographic region proximate the MS, which is then transmitted through the mobile communications system to the computer network. A converter server such as an Optical Character Reader (OCR) server interfaced with the global computer network converts the digital image to a text format which is then compared, along with a general location identifier of the MS to geographic data stored in a location database connected to the global computer network. Based on a comparison of the converted text data and the general location identifier of the MS to the geographic data stored in the location server, a precise location of the MS is determined and transmitted to the MS.

23 Claims, 4 Drawing Sheets

METHOD AND APPARATUS FOR PROVIDING PRECISE LOCATION INFORMATION THROUGH A COMMUNICATIONS NETWORK

BACKGROUND OF THE INVENTION

1. Field of the Invention

The present invention provides a method and apparatus for obtaining information using a mobile station (MS) through interaction with a communications network.

2. Description of the Related Art

In mobile communications systems it is often desirable to pinpoint with relative accuracy a geographic location of a mobile station. Such exact location information can be used for numerous purposes such as, for example, to provide directions to a system user of the mobile station who is lost or trying to avoid road congestion, directing the system user to a nearby service provider (e.g. to obtain gasoline, automotive repairs), obtaining information about a location or object proximate the mobile station, etc. Several techniques are known for obtaining a general location of a mobile station. For example, the general location may be determined using Location Service Area (LSA) identification techniques employed in known SoLSA techniques. The LSA is a location service area corresponding to the cell coverage area of a particular mobile network cell through which the MS communicates. Other location determining techniques are discussed in WO-9205672; U.S. Pat. No. 5,128,925; WO-9727711; EP 0 930 513 A2 and WO-9819479.

Although such prior art systems are useful in that they may provide for the communication to a MS of information pertaining to a general or large surrounding geographic area encompassing the MS, such known techniques do not identify, with relative pinpoint accuracy, an exact location of a MS. Thus, a user of a MS cannot be informed of pertinent information concerning the immediate geographic area surrounding the MS.

SUMMARY OF THE INVENTION

The present invention improves over prior locator and information systems by providing a method and apparatus for identifying a precise location of a mobile station through interaction with a mobile communications network and a global computer network. This is accomplished, in accordance with one embodiment of the present invention, by inputting to a subject mobile station, a digital image of a geographic location surrounding the subject MS or an object proximate the MS and transmitting the digital image through a mobile communications network, such as a General Packet Radio Service (GPRS) network or a Global System for Mobile Communication (GSM), servicing the MS. The digital image is then conveyed to a global communications network, such as the Internet or World Wide Web, through an access port. A conversion server is accessible through the global communications network for converting the digital image data to text data which is then forwarded to a location server, also accessible through the global communications network. The location server receives a general location address of the MS by, for example, identifying a base station through which the MS communicates and, utilizing the general location address and text data, compares this information to geographic location information stored in a database. The stored geographic location information is typically a library of regional street maps and landmarks contained in a database located in or accessible by the location server. Once the exact location of the MS is determined, the location information is transmitted back to the MS.

The determined location information can be used in numerous applications. For example, in one embodiment one or more service servers can be accessible to the global communications network to provide a host of information services tailored to the determined MS location. Such services may include providing a local street traffic report, a weather report, as well as the identities and locations of the nearest goods or service providers to allow a MS user who may be in need of immediate goods/services to locate such goods/services, e.g., the location of a nearest gasoline station or automotive repair center, etc.

In another embodiment, a digital image of an object or location proximate the MS is obtained and transmitted, through the MS, to a computer network. The computer network, in turn, analyzes the image, obtains information concerning the image and transmits such obtained information to the MS. For example, the object may be a consumer product (e.g., an automobile) and an MS user may desire to obtain information, such as product safety information, concerning the automobile. In accordance with the present invention an image of the automobile can be transmitted by the MS to the computer network to allow the computer network to retrieve desired information relating to the automobile.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are merely intended to conceptually illustrate the structures and procedures described herein.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
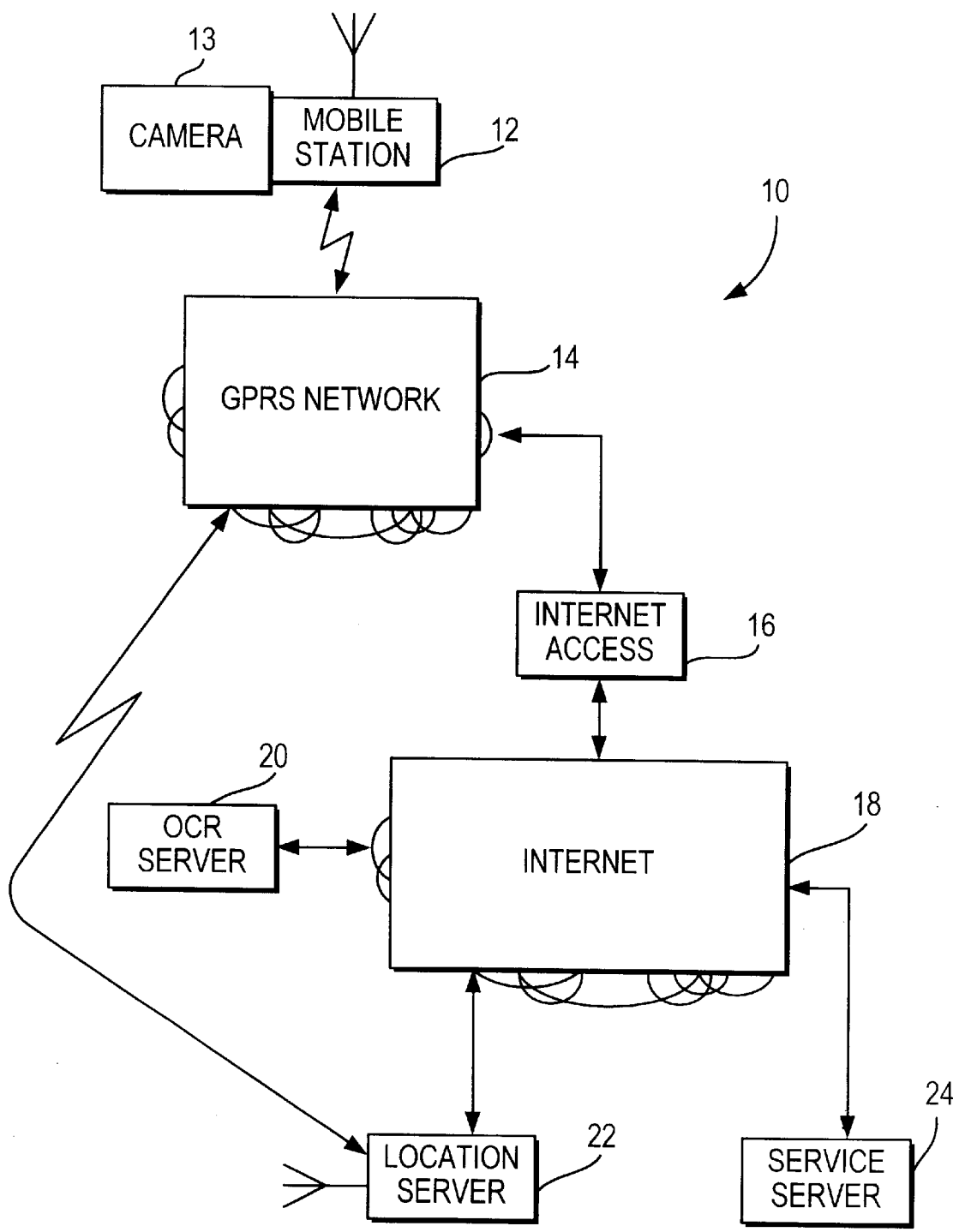
FIG. 1 depicts a block diagram of the system architecture of the presently preferred embodiment.
Figure 2:
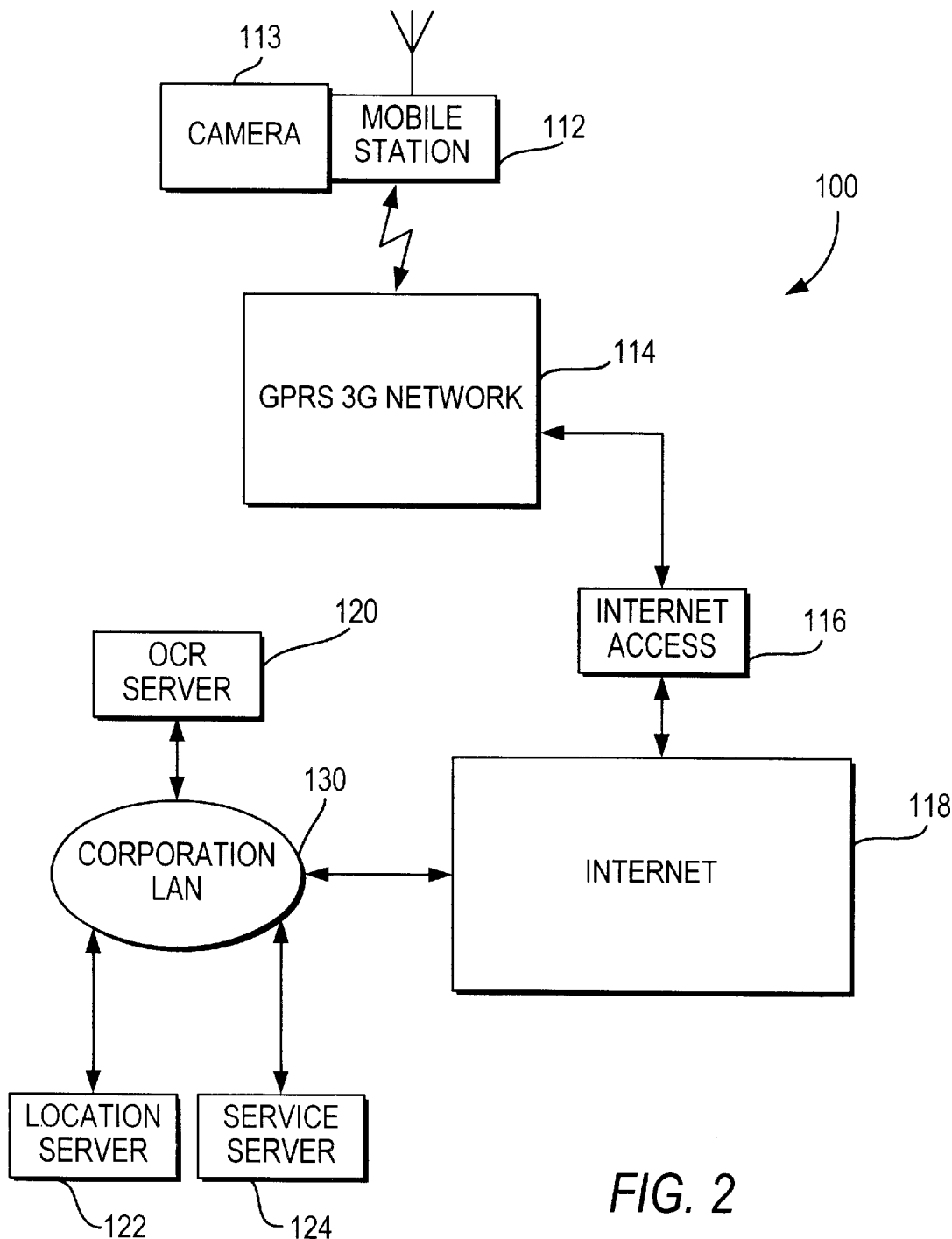
FIG. 2 depicts a block diagram of the system architecture of one alternative embodiment.

A system 10 for providing accurate location information to a mobile communications network user in accordance with a currently preferred embodiment of the present invention is illustrated in FIG. 1. System 10 provides interaction and communication between a mobile station 12 and a computer network 18. The computer network may be, for example, the Internet, or World Wide Web, and these terms are used interchangeably herein. The MS 12 may be a mobile telephone, a personal digital assistant (PDA) as well as any other type of wireless communication devices including a laptop computer with wireless communication capability. The MS 12 communicates with other mobile stations in a manner well-known to those having ordinary skill in the art, through a mobile communications network 14 such as a Global System For Mobile Communication (GSM) or a General Packet Radio Service Network (GPRS). A GPRS network 14 is represented in FIG. 1. Also as is known in the art, network 14 is capable of communicating with the computer network or Internet 18 through wireless transmission to a receiver at an Internet access port 16 for providing a path for information to be exchanged between the MS 12 and the Internet 18. System 10 further includes a data conversion server 20 for converting digital image data to a text format, as is known in the art. A suitable server for this purpose is an Optical Character Recognition (OCR) server. A location server 22 is also accessible through the Internet 18 to obtain specific and precise MS location information in a manner set forth below.

When a user of the MS 12 desires to know his or her exact location, the user will obtain a digital image of a geographic location proximate the MS. Such a digital image may be of a building, an intersection with a street sign, a landmark, etc., and may be obtained through the use of a digital camera 13. In a preferred embodiment, camera 13 may be combined with the MS 12 to form a single component, as more fully described in WO 96-38762, or may be a separate unit capable of being interfaced with the MS 12. In the latter case, camera 113 and mobile station 112 can be interconnected using a fixed transmission line. Alternatively, the digital image can be downloaded to the mobile station 112 from a data storage device, such as a floppy disc onto which the image has been stored. The digital picture obtained by the camera 113 will thus be transferred from the camera to the mobile phone via the fixed transmission line. As an alternative, the digital camera 113 and MS 112 may both include Bluetooth transceivers for providing wireless communication therebetween. Moreover, the digital camera may be mounted to a dashboard of an automobile and electrically or wirelessly connected to an MS such as a car phone. The digital camera could then be controlled by hardware or software contained in the automobile for positioning the camera to obtain an appropriate digital image while the automobile is operated, for example, to receive images of street signs, etc. The MS 12 then communicates the digital image obtained from camera 13 to the mobile network 14 along with a request to identify the exact MS location. Mobile network 14 will contact or otherwise access the Internet 18 through Internet access port 16 and convey the digital image to various servers in communication with the Internet to obtain a precise location of the MS. This is accomplished, for example, by dialing an Internet access code (e.g. telephone number) and connecting to an Internet server.

The apparatus 10 can identify a precise location of the MS by utilizing the digital image information directly or, in accordance with a preferred embodiment of the present invention, convey the digital data to a data converter, such as an Optical Character Recognizer (OCR) server 20 for converting the digital image to binary text data. As is known in the art, the OCR server 20 converts the received digital image of the geographic location proximate the MS 12 into a bit format, e.g. binary text. This information is then communicated to a location server (LS) 22 for identification. Prior to, after or concurrent with the receipt of the binary text version of the geographic image, the LS will obtain a general location in which the geographic image is contained, i.e., in which the MS is located. This is performed through communication between the LS and the communication network 14. For example, in response to a request placed by the LS, the network 14 will provide the LS with the Location Area Identity (LAI) of the cell/base station (BS) or group of cells/base stations in communication with the MS 12 as well as other information the network 14 may have concerning the general location of the MS 12. In the case of a GSM network 14, the LAI can be in the form of a visitor location register (VLR) of a Mobile Switching Center (MSC).

The LS contains or has access to a database containing location information such as street maps, locations of buildings, landmarks, etc. Upon receipt of the LAI which identifies the general geographic region of the MS 12, the LS uses the binary text information to pinpoint an exact location within the general geographic region. This is accomplished by comparing the binary text and LAI information with the location database data. The OCR server has the capability of constructing patterns from images of the transmitted picture. Thus, the patterns will be compared to existing patterns in the location server and mapped to certain database patterns, provided that a certain minimum threshold of mapping is met. Once a location or "match" is identified, the location is transmitted back to the MS. This can occur via a combination of the Internet 18 and network 14, or directly between the LS 22 and network 14 through, for example, wireless communication therebetween. The location information can be in the form of a text message or diagram (e.g. map) displayed on a display incorporated in the MS, or may be an audible message broadcast from a mobile phone or from speakers connected to a mobile phone such as when a location request is placed through a car phone.

The precise location information can be used in a variety of applications and to provide a variety of information services to a MS user. For example, in the event the MS user is lost while driving, the inventive apparatus 10 will allow for directions to be transmitted to the user once the MS precise location is known. In a preferred embodiment, a service server 24 may be provided in communication with, for example, the Internet 18 for conveying information in response to a query placed through the MS concerning goods or service providers that are located closely proximate to or in the immediate vicinity of the MS user. For example, if the user is in need of gasoline or automotive repairs, the precise MS location can be used to access the service server 24 to locate gasoline stations or service stations closely proximate to the MS 12 and to provide directions to such stations. In the event the goods or service providers have a URL address to provide for Internet access, such addresses can also be transmitted for display on the MS. In another embodiment, the service server 24 may be part of or used in conjunction with an incentive rewards program as more fully disclosed in commonly-owned U.S. patent application Ser. No. 09/471,875 Method and Apparatus for Accessing an Interactive Incentive Rewards Program Through a Wireless Communications Network, filed Nov. 23, 1999, the disclosure of which is incorporated herein by reference, to provide the location of service provider program members which can then be visited by the MS user to redeem or accumulate rewards points.

As an alternative to the apparatus 10 of FIG. 1 wherein the OCR server 20, location server 22 and service server 24 are capable of direct communication with the Internet 18, a system 100 can be provided wherein a local area network (LAN) 130 can be used to interface these components with the Internet in a manner well-known to those having skill in the art. Moreover, although separate components are shown, the OCR server, location server and service server can be integral with the LAN 130.

Figure 3:
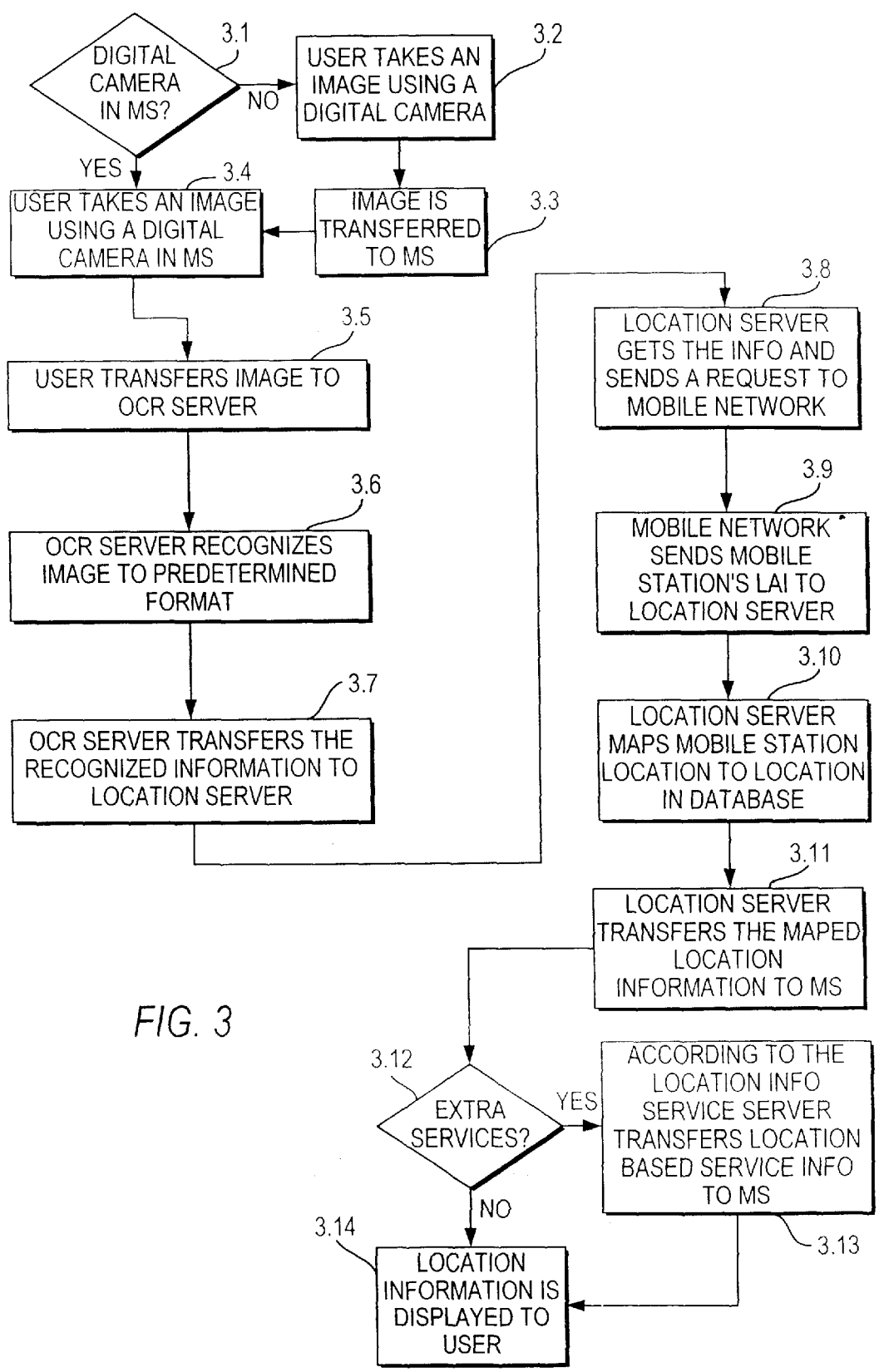
FIG. 3 depicts a flow chart of the method in accordance with one embodiment of the present invention.

Turning now to FIG. 3, a flow chart of the inventive method of obtaining a precise location for a MS is depicted. The communication of a digital image from the MS to the OCR server is described in steps 3.1 to 3.7. The communication between the location server and the mobile network to obtain the mobile station LAI is described in steps 3.8 and 3.9, and the location server mapping to identify an exact location of the MS and to transmit the location information to the MS is described in steps 3.10 and 3.11. In the event extra services are requested, such as through the inclusion of and communication with a service server 24, steps 3.12 to 3.14 are performed.

Figure 4:
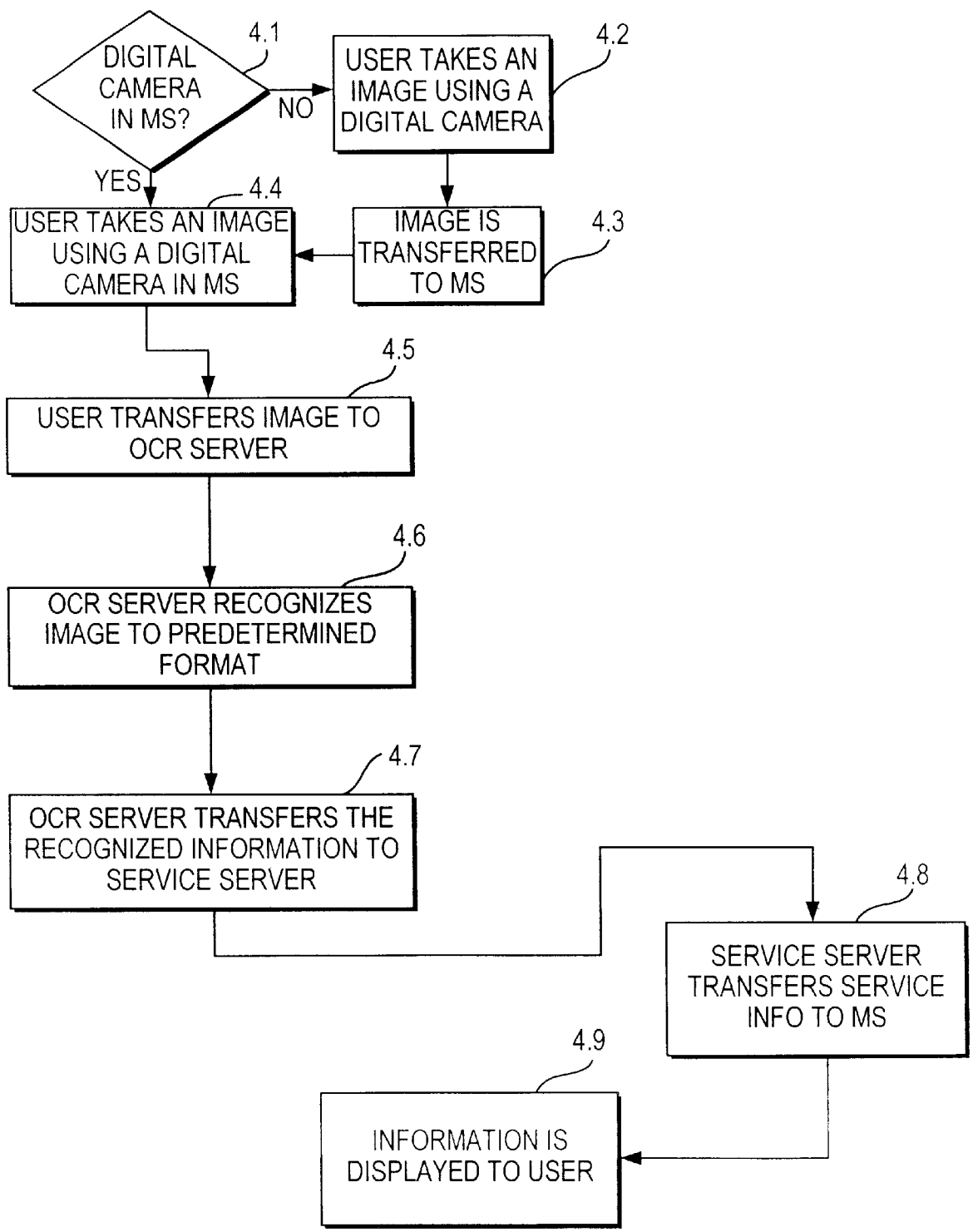
FIG. 4 depicts a flow chart of the method in accordance with another embodiment of the present invention.

In yet another embodiment of the invention shown by the method of FIG. 4, system 10 can provide information concerning a product or object by obtaining a digital image of the product or object and transmitting the image via connection with the MS 12 to the Internet 18. The digital image will then be identified by the service server 24 and, in response to a query or other command communicated to the Internet by a user of the MS 12, will locate and provide information pertaining to the image of the object. In this manner, information can be provided, for example, on a consumer product (e.g., automobile) by transmitting a digital image of the automobile along with a query to search and locate desired information such as for safety features, manufacturer cost, etc.

The system 10 can also be used to assist travelers with foreign language translations. For example, a digital image of a sign or word containing foreign language can be conveyed to the service server 24 for translation, with the translation then being transmitted to the MS along with an audible pronunciation of the word and/or product information relating to the translated word and/or a location associated with the word. Moreover, the system can be used to provide advertisement information pertaining to a specific retail or service provider location by transmitting through the MS an image of a retail outlet. The service server will then locate, via access to an advertiser database, information concerning special offers or sales pertaining to the retail outlet, etc. The cost of such information service can be primarily paid by such advertisers, thereby reducing the cost of such service to the MS user.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of obtaining a geographic location of a mobile station, comprising the steps of:
    obtaining a digital image of a geographic location proximate the mobile station;
    wirelessly transmitting said digital image from said mobile station to a mobile communications network;
    contacting a computer network through said mobile communications network;
    obtaining a general location identifier of the mobile station from said mobile communications network; and
    comparing the general location identifier and information corresponding to said digital image to pre-stored data accessible through said computer network to determine the geographic location of the mobile station.

2. The method of claim 1, further comprising converting the digital image to a binary text format and wherein said information corresponding to said digital image comprises said binary text format.

3. The method of claim 2, wherein said pre-stored data comprises area maps contained within the general location and wherein said comparing step further comprises comparing the binary text format and general location identifier to the area maps.

4. The method of claim 2, wherein the converting of the image from digital format to binary text format is performed using an optical character reader (OCR) in communication with the computer network.

5. The method of claim 1, wherein said mobile communications network comprises a GSM network and said step of obtaining a general location identifier of the mobile station comprises obtaining a Location Area Identity (LAI) associated with the mobile station.

6. The method of claim 1, wherein said step of obtaining a digital image further comprises the step of utilizing a digital camera capable of communicating with the mobile station.

7. The method of claim 6, wherein the digital camera is integrally formed with the mobile station.

8. The method of claim 1, wherein the mobile station comprises a mobile telephone and wherein said computer network comprises a global computer network.

9. The method of claim 1, wherein said mobile communications network comprises a General Packet Radio Service (GPRS) network.

10. The method of claim 1, further comprising the step of transmitting the identified geographic location to the mobile station.

11. The method of claim 1, further comprising the step of identfying the location of service providers utilizing the identified geographic location in response to a query transmitted by the mobile communications system to the computer network and transmitting identified service provider location information to the mobile station.

12. The method of claim 11, wherein said service provider location information corresponds to service providers that are participants in a rewards program so that a user of the mobile station who is a member of the rewards program can solicit the service providers to acquire rewards points and to redeem rewards points.

13. An apparatus for obtaining a geographic location of a mobile station comprising:
    a digital camera capable of interfacing with the mobile station for obtaining a digital image of a geographic area proximate the mobile station and for conveying the digital image to the mobile station;
    a mobile communications network for receiving the digital image from the mobile station, said network having means for determining a general location identifier of the mobile station;
    a computer network in communication with said mobile communications network for receiving the digital image and the general location identifier of the mobile station from said mobile communications network;
    a location server having access to a library of stored geographic location data; and means for comparing the means for comparing information corresponding to the digital image and the general location identifier to the stored geographic location data to identify the geographic location of the mobile station.

14. The apparatus of claim 13, further comprising a converter in communication with said computer network for converting the digital image into text data.

15. The apparatus of claim 13, wherein the mobile station is a mobile phone integrally formed with said digital camera.

16. The apparatus of claim 13, wherein said mobile communications network comprises a General Packet Radio Service (GPRS).

17. The apparatus of claim 13, wherein said global communications network comprises a Global System for Mobile Communication (GSM).

18. The apparatus of claim 17, wherein the general location identifier comprises a Location Area Identity (LAI) of a base station in communication with the mobile station.

19. The apparatus of claim 13, further comprising a service provider database in communication with said computer network for identifying service provider locations based on the identified geographic location of the mobile station.

20. The apparatus of claim 19, further comprising means for transmitting the identified geographic location and the identified service provider locations to the mobile station.

21. The apparatus of claim 13, further comprising means for transmitting the identified geographic location to the mobile station.

22. The apparatus of claim 21, further comprising means for identfying locations of service providers corresponding to service providers that are participants in a rewards program so that a user of the mobile station who is a member of the rewards program can solicit the service providers to acquire rewards points and to redeem rewards points.

23. The apparatus of claim 13, wherein said digital camera includes means for wirelessly communicating the digital image to the mobile station.

* * * * *

UNITED STATES PATENT AND TRADEMARK OFFICE
CERTIFICATE OF CORRECTION

| | |
|---|---|
| PATENT NO. | : 6,522,889 B1 |
| APPLICATION NO. | : 09/471875 |
| DATED | : February 18, 2003 |
| INVENTOR(S) | : Ari Aarnio |

It is certified that error appears in the above-identified patent and that said Letters Patent is hereby corrected as shown below:

Column 7, line 1 in claim 13 now reads

"means for comparing the means for comparing informa-", should read -- means for comparing informa- --.

Signed and Sealed this

Twenty-second Day of August, 2006

JON W. DUDAS
*Director of the United States Patent and Trademark Office*